United States Patent
Hata et al.

(10) Patent No.: US 7,417,414 B2
(45) Date of Patent: Aug. 26, 2008

(54) SEMICONDUCTOR DEVICE PROVIDED WITH FEEDBACK CIRCUIT INCLUDING RESISTIVE ELEMENT AND CAPACITIVE ELEMENT

(75) Inventors: Takehiro Hata, Tokyo (JP); Tatsuo Kuroiwa, Tokyo (JP); Eiji Onishi, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 0 days.

(21) Appl. No.: 11/334,501

(22) Filed: Jan. 19, 2006

(65) Prior Publication Data

US 2006/0164055 A1 Jul. 27, 2006

(30) Foreign Application Priority Data

Jan. 21, 2005 (JP) ............................. 2005-013729
Dec. 8, 2005 (JP) ............................. 2005-354620

(51) Int. Cl.
*G05F 1/575* (2006.01)
*G05F 5/00* (2006.01)

(52) U.S. Cl. .................. 323/286; 323/299; 323/267

(58) Field of Classification Search ............... 323/272, 323/299, 301, 303, 282, 222, 267, 286
See application file for complete search history.

(56) References Cited

U.S. PATENT DOCUMENTS

| | | | |
|---|---|---|---|
| 5,490,055 A * | 2/1996 | Boylan et al. | 363/41 |
| 5,877,611 A * | 3/1999 | Brkovic | 323/222 |
| 6,147,478 A * | 11/2000 | Skelton et al. | 323/288 |
| 6,346,798 B1 * | 2/2002 | Passoni et al. | 323/272 |
| 6,642,696 B2 | 11/2003 | Tateishi | |
| 6,680,604 B2 * | 1/2004 | Muratov et al. | 323/285 |
| 6,798,180 B2 | 9/2004 | Sase et al. | |
| 6,879,137 B2 | 4/2005 | Sase et al. | |
| 6,922,044 B2 * | 7/2005 | Walters et al. | 323/288 |
| 2005/0127886 A1 | 6/2005 | Sase et al. | |
| 2006/0284609 A1 * | 12/2006 | Weng et al. | 323/286 |

FOREIGN PATENT DOCUMENTS

| | | |
|---|---|---|
| JP | 2001-86740 A | 3/2001 |
| JP | 2003-52170 A | 2/2003 |
| JP | 2004-80985 A | 2/2004 |

\* cited by examiner

*Primary Examiner*—Jeffrey L. Sterrett
*Assistant Examiner*—Harry Behm
(74) *Attorney, Agent, or Firm*—McDermott Will & Emery LLP

(57) ABSTRACT

The present invention provides a switching power supply circuit capable of stabilizing an output voltage as well as increasing a response speed of the output voltage by improving a phase margin of an open loop as a whole of the switching power supply circuit. The switching power supply circuit according to the present invention includes a resistor and a capacitor in addition to a configuration of a conventional switching power supply circuit. The resistor is connected between a node and the capacitor. The capacitor is connected between the resistor and another node. The resistor and the capacitor configure a phase compensation circuit. The phase compensation circuit has a cut-off frequency in accordance with a resonance frequency of an inductor and a capacitor by adjusting a resistance value of the resistor and a capacitance of the capacitor.

7 Claims, 14 Drawing Sheets

F I G. 2
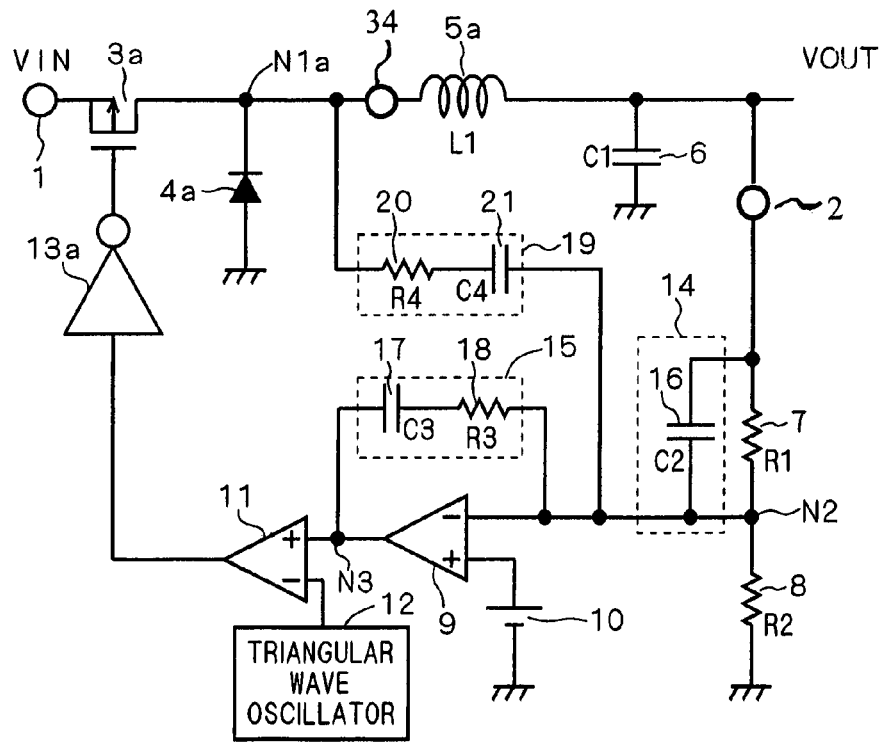

F I G . 1 5   PRIOR ART

SEMICONDUCTOR DEVICE PROVIDED WITH FEEDBACK CIRCUIT INCLUDING RESISTIVE ELEMENT AND CAPACITIVE ELEMENT

BACKGROUND OF THE INVENTION

1. Field of the Invention

The present invention relates to a semiconductor device. In particular, the present invention relates to a switching power supply circuit.

2. Description of the Background Art

In a switching power supply circuit as one of semiconductor devices, an error between a voltage obtained by division of an output voltage by a serial resistive element and a predetermined reference voltage is amplified with an error amplifier. On the basis of the error, On-Duty of a switching element is controlled with a PWM (Pulse Width Modulator) comparator, to keep an output voltage value constant. Thus, it is possible to obtain a desired direct current voltage from an input direct current voltage.

It is to be noted that conventional techniques regarding the switching power supply circuit are disclosed in, for example, Japanese Patent Application Laid-Open Nos. 2001-86740, 2003-52170 and 2004-80985.

As thus described, in the switching power supply circuit, an output voltage is fed back to the error amplifier to control the output voltage. Incidentally, in the switching power supply circuit, a low-pass filter circuit including an inductor and a capacitor is connected between an input terminal and an output terminal. Therefore, according to the configuration where the output voltage is fed back to the error amplifier, the aforementioned inductor and capacitor are included in the feedback loop. For this reason, there is a problem in that a phase of an open loop as a whole of the power supply circuit in a resonance frequency of the inductor and the capacitor changes by about 180°, which causes a phase margin to be lost, leading to oscillation of the circuit.

SUMMARY OF THE INVENTION

It is an object of the present invention to provide a semiconductor device capable of stabilizing an output voltage as well increasing a response speed of the output voltage by addition of a new feedback loop for improving a phase margin of an open loop as a whole of a switching power supply circuit.

According to a first aspect of the present invention, a semiconductor device includes an input terminal, an output terminal, a switching element, an output voltage detection circuit, a control circuit and a feedback circuit. The switching element is connected between the input terminal and the output terminal. The output voltage detection circuit detects an output voltage as a voltage of the output terminal. The control circuit is connected between a control electrode of the switching element and the output voltage detection circuit, and controls driving of the switching element on the basis of the output voltage detected by the output voltage detection circuit. The feedback circuit is connected between a first node as an output electrode of the switching element and a second node located between the output voltage detection circuit and the control circuit, and includes a resistive element and a capacitive element.

Thus, it is possible to improve a phase margin of the open loop as a whole of the switching power supply circuit.

A semiconductor device according to a second aspect of the present invention includes an input terminal, an output terminal, a switching element, an output voltage detection circuit, a control circuit and a feedback circuit. The switching element is connected between a first node located between the input terminal and the output terminal and a ground potential. The output voltage detection circuit detects an output voltage as a voltage of the output terminal. The control circuit is connected between a control electrode of the switching element and the output voltage detection circuit, and controls driving of the switching element on the basis of the output voltage detected by the output voltage detection circuit. The feedback circuit is connected between the control electrode and a second node located between the output voltage detection circuit and the control circuit, and includes a resistive element and a capacitive element.

Thus, it is possible to improve a phase margin of the open loop as a whole of the switching power supply circuit.

A semiconductor device according to a third aspect of the present invention includes an input terminal, an output terminal, a transformer, a switching element, an output voltage detection circuit, a control circuit and a feedback circuit. The transformer is connected between the input terminal and the output terminal. The switching element is connected to the transformer. The output voltage detection circuit detects an output voltage as a voltage of the output terminal. The control circuit is connected between a control electrode of the switching element and the output voltage detection circuit, and controls driving of the switching element on the basis of the output voltage detected by the output voltage detection circuit. The feedback circuit is connected between a first node located between the control electrode and the output voltage detection circuit and a second node located between the output voltage detection circuit and the control circuit, and includes a resistive element and a capacitive element.

Thus, it is possible to improve a phase margin of the open loop as a whole of the switching power supply circuit.

A semiconductor device according to a fourth aspect of the present invention includes an input terminal, an output terminal, a switching element, an output voltage detection circuit, a control circuit and a feedback circuit. The switching element is connected between the input terminal and the output terminal. The output voltage detection circuit detects an output voltage as a voltage of the output terminal. The control circuit is connected between a control electrode of the switching element and the output voltage detection circuit, and controls driving of the switching element on the basis of the output voltage detected by the output voltage detection circuit. The feedback circuit is connected between the control electrode and a node located between the output voltage detection circuit and the control circuit, and includes a resistive element and a capacitive element.

Thus, it is possible to improve a phase margin of the open loop as a whole of the switching power supply circuit.

A semiconductor device according to a fifth aspect of the present invention includes a first input terminal, a first output terminal, a first switching element, a first output voltage detection circuit, a first control circuit, a first feedback circuit, a second input terminal, a second output terminal, a second switching element, a second output voltage detection circuit, a second control circuit and a second feedback circuit. The first switching element is connected between the first input terminal and the first output terminal. The first output voltage detection circuit detects a first output voltage as a voltage of the first output terminal. The first control circuit is connected between a control electrode of the first switching element and the first output voltage detection circuit, and controls driving of the first switching element on the basis of the first output voltage detected by the first output voltage detection circuit.

The first feedback circuit is connected between a first node as an output electrode of the first switching element and a second node located between the first output voltage detection circuit and the first control circuit, and includes a first resistive element and a first capacitive element. The second switching element is connected between a third node located between the second input terminal and the second output terminal and a ground potential. The second output voltage detection circuit detects a second output voltage as a voltage of the second output terminal. The second control circuit is connected between a control electrode of the second switching element and the second output voltage detection circuit, and controls driving of the second switching element on the basis of the second output voltage detected by the second output voltage detection circuit. The second feedback circuit is connected between the control electrode of the second switching element and a fourth node located between the second output voltage detection circuit and the second control circuit, and includes a second resistive element and a second capacitive element.

Thus, it is possible to improve a phase margin of the open loop as a whole of the switching power supply circuit.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a circuit diagram showing a configuration of a switching power supply circuit according to an embodiment of the present invention, which corresponds to FIG. 1;

DESCRIPTION OF THE PREFERRED EMBODIMENTS

The semiconductor device according to the present invention is applicable to various electronic devices, in particular, portable devices such as a digital steel camera (DSC) and a digital video camera (DVC), although not limited thereto, as a switching power supply with an input direct current voltage of the order of 1.5 to 4.2 V and an output direct current voltage of the order of −8 to +16 V.

In the following, embodiments of the semiconductor device according to the present invention will be specifically described by means of drawings, taking a switching power supply circuit as an example. It is to be noted that elements provided with the same one symbol in different drawings are equivalent or correspond to one another.

Figure 1:
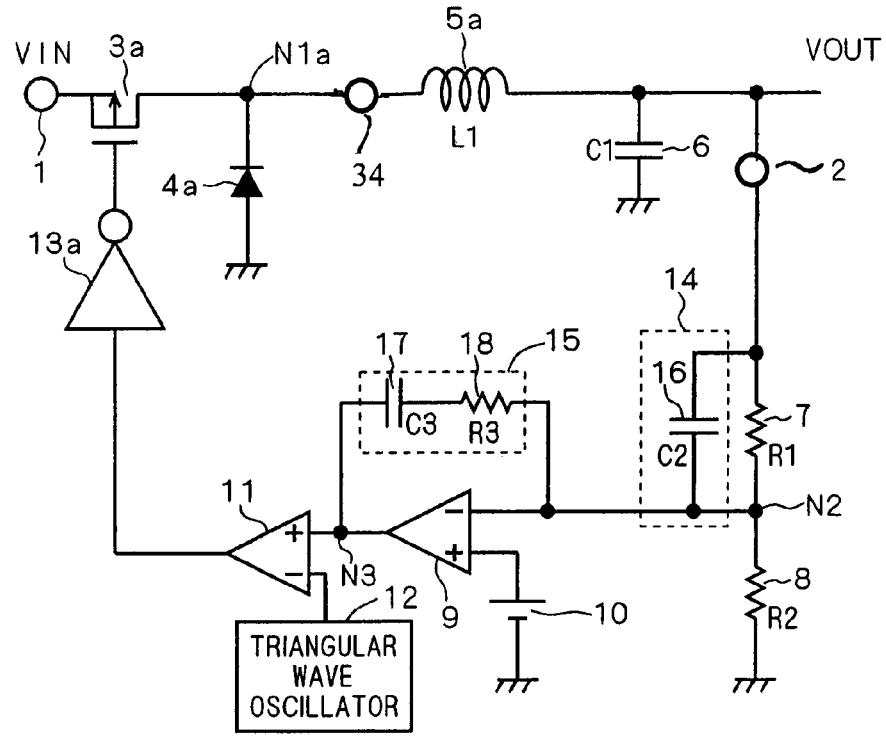
FIG. 1 is a circuit diagram showing a configuration of a conventional switching power supply circuit.

FIG. 1 is a circuit diagram showing a configuration of a conventional switching power supply circuit. FIG. 2 is a circuit diagram showing a configuration of a switching power supply circuit according to an embodiment of the present invention, corresponding to FIG. 1. FIGS. 1 and 2 each show a step-down diode rectification switching power supply circuit.

Referring to FIG. 1, the conventional step-down diode rectification switching power supply circuit includes an input terminal 1, an output terminal 2, a terminal 34, a PMOS transistor 3a, a diode 4a, an inductor 5a (inductance L1), capacitors 6, 16, 17 (capacitances C1, C2, C3), resistors 7, 8, 18 (resistance values R1, R2, R3), an error amplifier 9, a power supply 10, a PWM comparator 11, a triangular wave oscillator 12, and a gate driver 13a.

An input voltage VIN as a direct current voltage is inputted into the input terminal 1. An output voltage VOUT as a direct current voltage is outputted from the output terminal 2. A gate electrode of the PMOS transistor 3a is connected to an output terminal of the gate driver 13a, a source electrode thereof is connected to the input terminal 1, and a drain electrode thereof is connected to a node N1a. An anode electrode of the diode 4a is connected to a ground potential (reference potential of the circuit), and a cathode electrode thereof is connected to the node N1a.

The inductor 5a is connected between the node N1a (the terminal 34) and the output terminal 2. The capacitor 6 is connected between the output terminal 2 and a ground potential. The resistor 7 is connected between the output terminal 2 and a node N2. The resistor 8 is connected between the node N2 and a ground potential. The capacitor C2 is connected between the output terminal 2 and the node N2, to constitute a phase compensation circuit 14.

A first input terminal (minus side) of the error amplifier 9 is connected to the node N2, a second input terminal (plus side) thereof is connected to the power supply 10, and an output terminal thereof is connected to a node N3. The power supply 10 is connected between the second input terminal of the error amplifier 9 and a ground potential, and outputs a predetermined reference voltage. The capacitor 17 is connected between the node N3 and the resistor 18. The resistor 18 is connected between the capacitor 17 and the node N2. The capacitor 17 and the resistor 18 constitute a phase compensation circuit 15.

A first input terminal (plus side) of the PWM comparator 11 is connected to the node N3, a second input terminal (minus side) thereof is connected to the triangular wave oscillator 12, and an output terminal thereof is connected to an input terminal of the gate driver 13a. An output terminal of the gate driver 13a is connected to the gate electrode of the PMOS transistor 3a.

Referring to FIG. 2, similar to the conventional switching power supply circuit shown in FIG. 1, the switching power supply circuit according to this embodiment also includes an input terminal 1, an output terminal 2, a terminal 34, a PMOS transistor 3a, a diode 4a, an inductor 5a, capacitors 6, 16, 17, resistors 7, 8, 18, an error amplifier 9, a power supply 10, a PWM comparator 11, a triangular wave oscillator 12, and a gate driver 13a. In addition to the configuration of the conventional switching power supply circuit, the switching power supply circuit according to this embodiment further includes a resistor 20 (resistance value R4) and a capacitor 21 (capacitance C4).

The resistor 20 is connected between the node N1a and the capacitor 21. The capacitor 21 is connected between the resistor 20 and the node N2. The resistor 20 and the capacitor 21 constitute a phase compensation circuit 19. The phase compensation circuit 19 improves a cut-off frequency of the open loop as a whole of the switching power circuit over a resonance frequency of the inductor 5a and the capacitor 6 by adjusting the resistance value R4 of the resistor 20 and the capacitance C4 of the capacitor 21. A feedback circuit, not including the inductor 5a and the capacitor 6 but including a serial connection of the resistor 20 and the capacitor 21 is connected between a drain electrode of the PMOS transistor 3a and a first input terminal of the error amplifier 9, to increase a phase margin of an open loop as a whole of the switching power supply circuit. Namely, addition of the phase compensation circuit 19 leads to phase progression, thereby to alleviate a phase change made due to the inductor 5a and the capacitor 6.

In the node N2, a partial voltage appears, which is obtained by division of the output voltage VOUT by the resistance values R1, R2 of the resistors 7, 8. Namely, the resistors 7, 8 function as an output voltage detection circuit for detecting the output voltage VOUT.

The error amplifier 9 amplifies an error between the partial voltage of the node N2 and the predetermined reference voltage inputted from the power supply 10, to output an error signal. The PWM comparator 11 generates a pulse signal a pulse width of which is modulated according to the error signal inputted from the error amplifier 9 and a triangular wave signal inputted from the triangular wave oscillator 12. The gate driver 13a controls drive of the PMOS transistor 3a, which is a switching element, based upon the pulse signal inputted from the PWM comparator 11. Thereby, the value of the output voltage VOUT is kept constant, to obtain a desired direct current voltage (VOUT) from the inputted direct current voltage (VIN). That is, the error amplifier 9, the PWM comparator 11, the power supply 10, the triangular wave oscillator 12 and the gate driver 13a function as a control circuit for controlling switching of the PMOS transistor 3a based upon the output voltage VOUT (strictly speaking, the partial voltage of the node N2) detected by the output voltage detection circuit including the resistors 7, 8.

Figure 3:
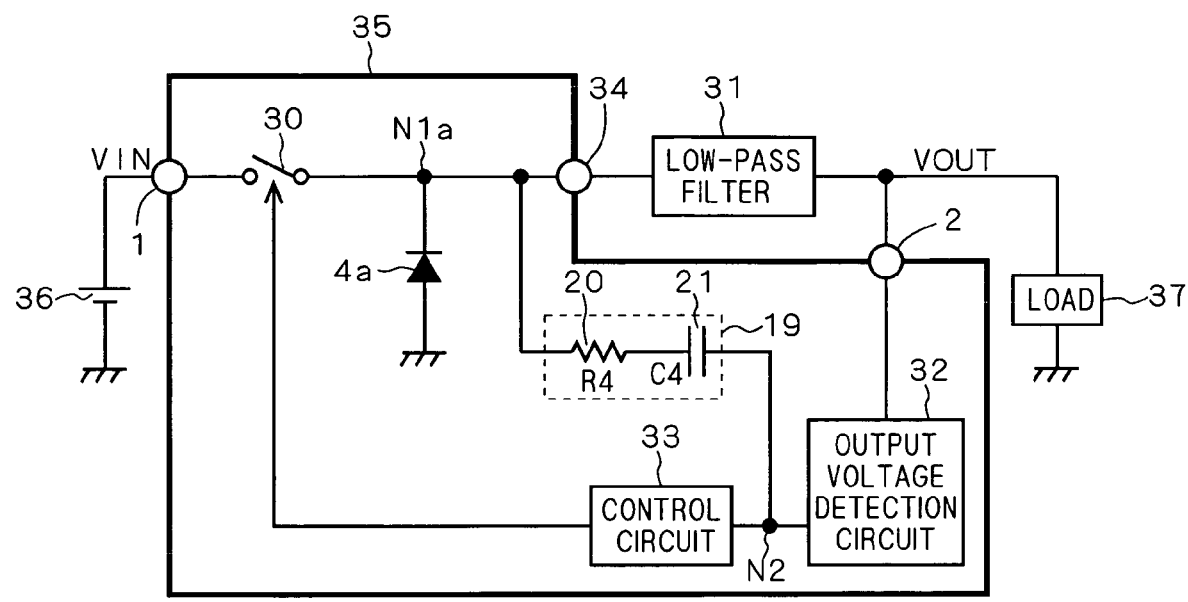
FIG. 3 is a block diagram functionally representing the switching power supply circuit shown in FIG. 2.

FIG. 3 is a block diagram functionally representing the switching power supply circuit shown in FIG. 2. In FIG. 3, the PMOS transistor 3a shown in FIG. 2 is represented as a switching element 30. Further, the inductor 5a and the capacitor 6 which are shown in FIG. 2 are represented as a low-pass filter 31. The resistors 7, 8 which are shown in FIG. 2 are represented as an output voltage detection circuit 32. The error amplifier 9, the PWM comparator 11, the power supply 10, the triangular wave oscillator 12 and the gate driver 13a which are shown in FIG. 2 are represented as a control circuit 33. It is to be noted that, in FIG. 3, the phase compensation circuits 14, 15 which are shown in FIG. 2 are not shown. In FIG. 3, a portion surrounded with a thick line 35 is a portion capable of integration as an IC. The input terminal 1 is connected to a direct current power supply 36. The output terminal 2 is connected to a load 37. The low-pass filter 31 is connected to a terminal 34.

Figure 4:
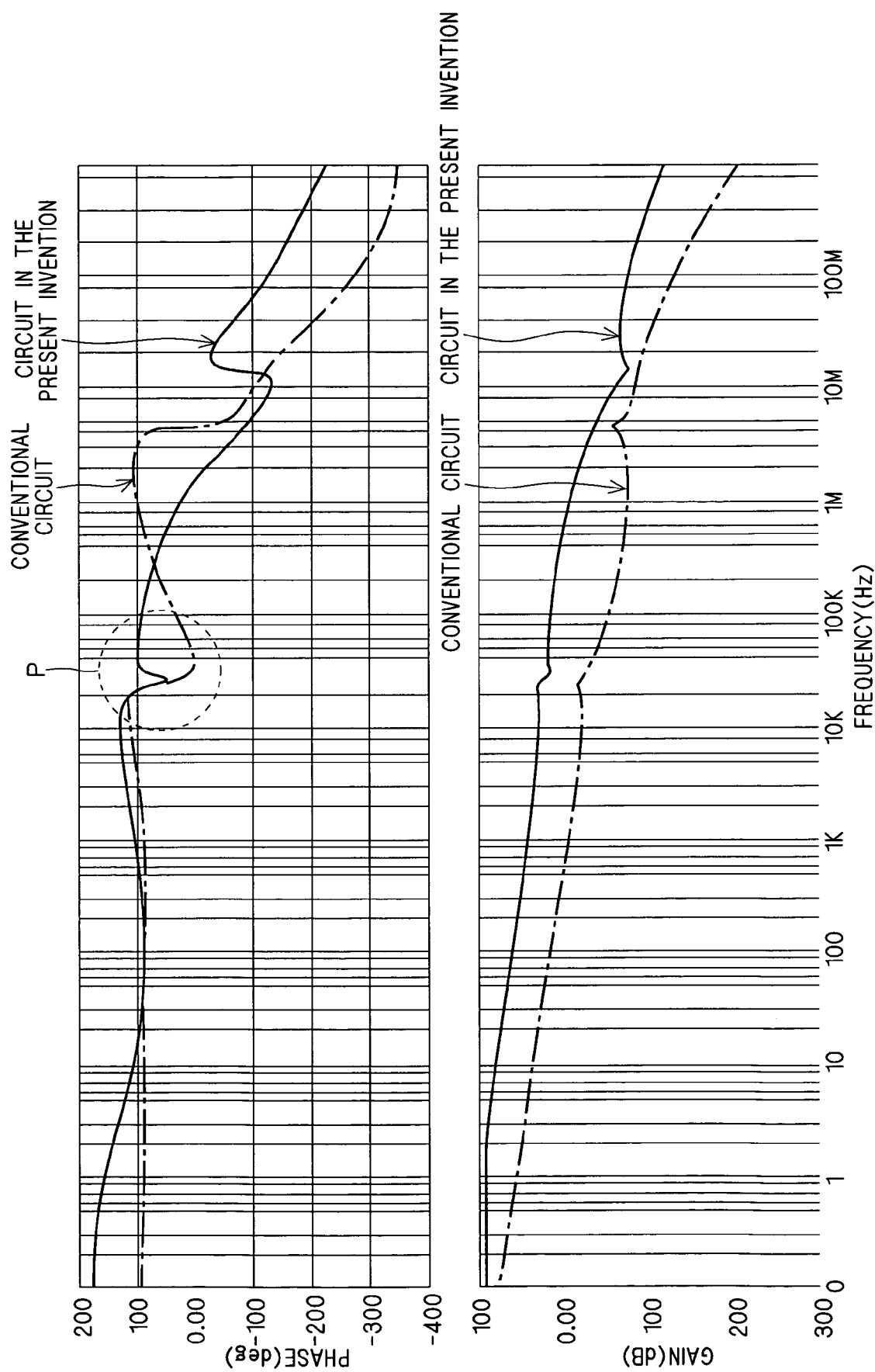
FIG. 4 is an open loop Bode diagram regarding the switching power supply circuit shown in FIG. 1 and the switching power supply circuit shown in FIG. 2.

FIG. 4 is an open loop Bode diagram regarding the conventional switching power supply circuit (conventional circuit) shown in FIG. 1 and the switching power supply circuit of this embodiment (circuit in the present invention) shown in FIG. 2. In the conventional circuit, a phase margin in the resonance frequency of the inductor 5a and the capacitor 6 is 6° or less. Namely, since the phase margin is small in the conventional circuit, it is likely that the output voltage VOUT oscillates due to an external parasitic LCR, and the output voltage VOUT is unstable. On the other hand, in the circuit in the present invention, the phase margin in the resonance frequency of the inductor 5a and the capacitor 6 is about 52°, indicating significant improvement in phase margin as compared with the conventional circuit (see a region P in FIG. 4).

As shown in FIG. 2, according to the switching power supply circuit of this embodiment, the phase compensation circuit 19 including the serial connection of the resistor 20 and the capacitor 21 is connected between the drain electrode of the PMOS transistor 3a and the first input terminal of the error amplifier 9. Thereby, as apparent from the Bode diagram shown in FIG. 4, the phase margin of the open loop as a whole of the switching power supply circuit increases. This results in significant improvement in phase margin as compared with the conventional switching power supply circuit shown in FIG. 1, to allow stabilization of the output voltage VOUT as well as increase a response speed of the output voltage VOUT.

In the following, modifications of the present invention will be described. Also in all modifications described below, it is possible to obtain a similar effect to the switching power supply circuit according to the above-mentioned embodiment.

First Modification

Figure 5:
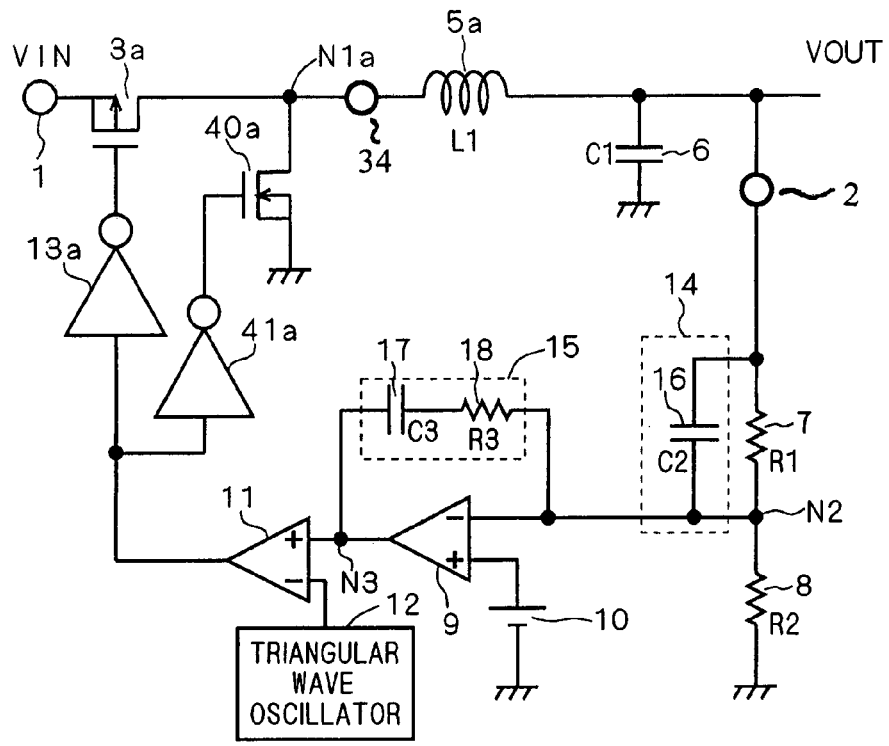
FIG. 5 is a circuit diagram showing a configuration of a conventional switching power supply circuit.
Figure 6:
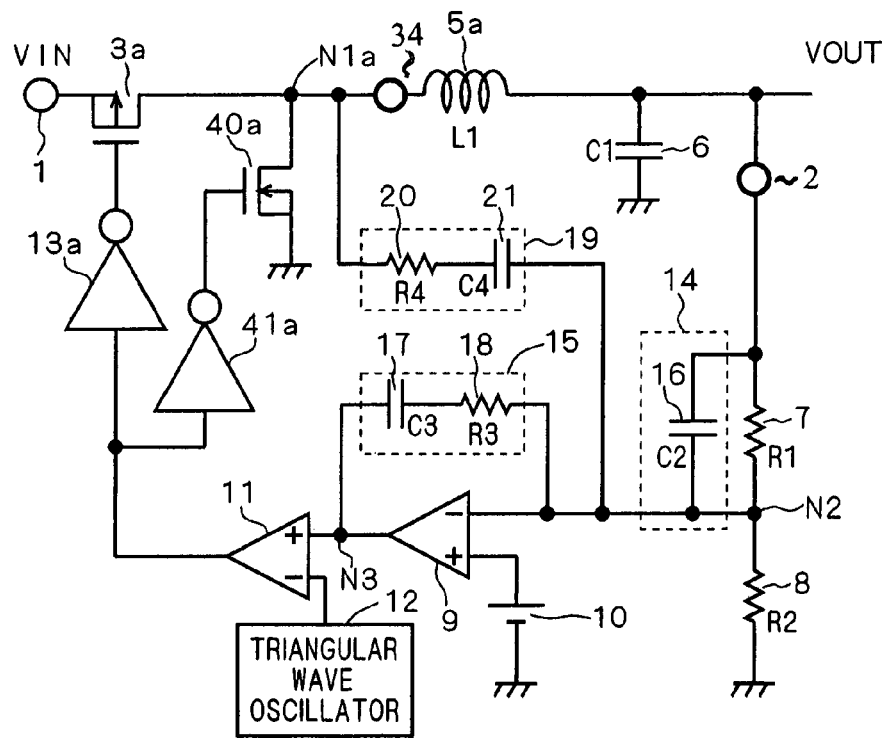
FIG. 6 is a circuit diagram showing a configuration of a switching power supply circuit according to a first modification of the present invention, which corresponds to FIG. 5.

FIG. 5 is a circuit diagram showing a configuration of a conventional switching power supply circuit. FIG. 6 is a circuit diagram showing a configuration of a switching power supply circuit according to a first modification of the present invention, corresponding to FIG. 5. FIGS. 5 and 6 each show a step-down synchronous rectification switching power supply circuit.

In the conventional switching power supply circuit shown in FIG. 5, an NMOS transistor 40a and a gate driver 41a are provided in place of the diode 4a in the conventional switching power supply circuit shown in FIG. 1. A gate electrode of the NMOS transistor 40a is connected to an output terminal of the gate driver 41a, a source electrode thereof is connected to a ground potential, and a drain electrode thereof is connected to a node N1a. An input terminal of the gate driver 41a is connected to an output terminal of the PWM comparator 11.

The switching power supply circuit according to the first modification of the present invention shown in FIG. 6 includes a phase compensation circuit 19 including a resistance 20 and a capacitor 21, in addition to the conventional switching power supply circuit shown in FIG. 5. As in the switching power supply circuit according to the embodiment of the present invention shown in FIG. 2, the resistor 20 is connected between the node N1a and the capacitor 21, and the capacitor 21 is connected between the resistor 20 and a node N2.

Second Modification

Figure 7:
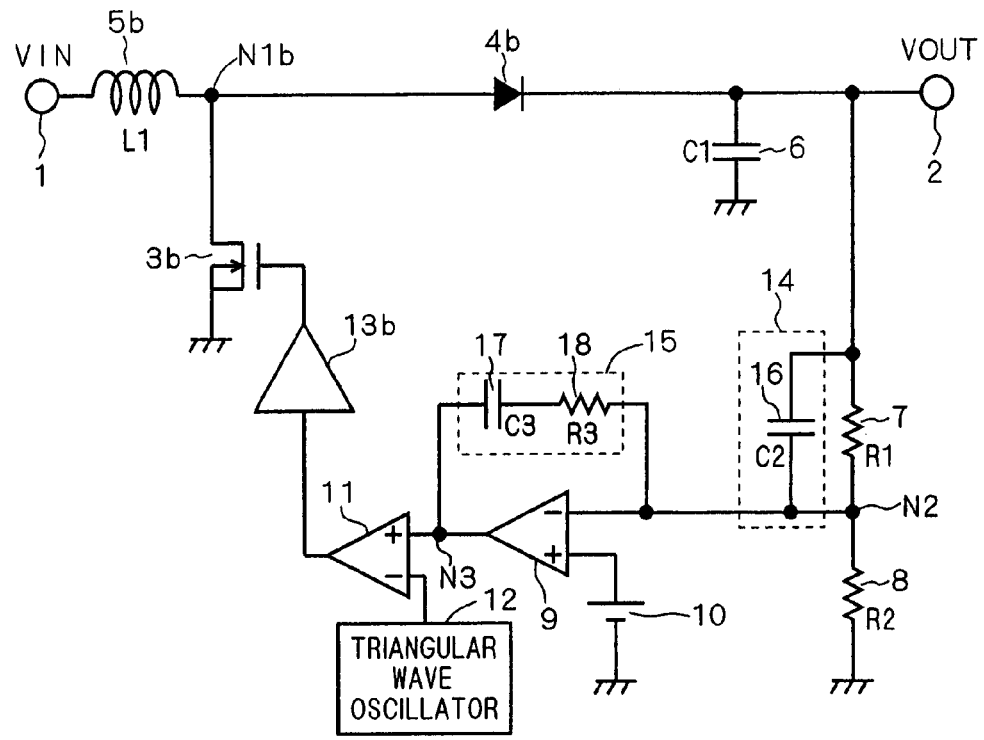
FIG. 7 is a circuit diagram showing a configuration of a conventional switching power supply circuit.
Figure 8:
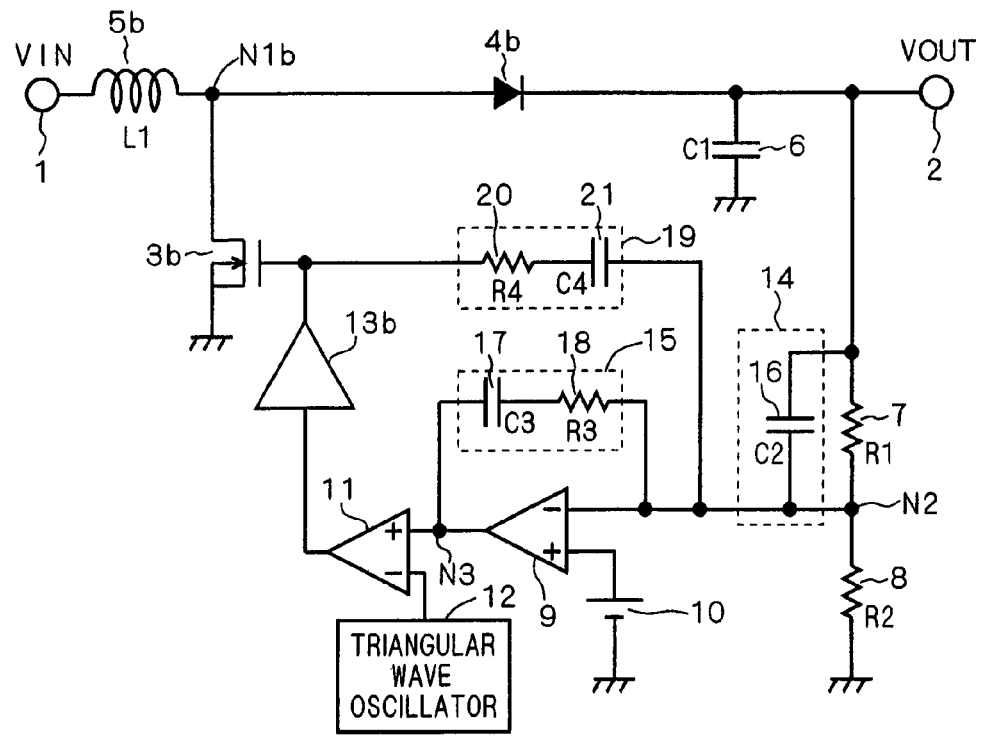
FIG. 8 is a circuit diagram showing a configuration of a switching power supply circuit according to a second modification of the present invention, which corresponds to FIG. 7.

FIG. 7 is a circuit diagram showing a configuration of a conventional switching power supply circuit. FIG. 8 is a circuit diagram showing a configuration of a switching power supply circuit according to a second modification of the present invention, corresponding to FIG. 7. FIGS. 7 and 8 each show a step-up diode rectification switching power supply circuit.

Referring to FIG. 7, the conventional step-up diode rectification switching power supply circuit includes an NMOS transistor 3b, a diode 4b, an inductor 5b, and a gate driver 13b. Similar to the conventional switching power supply circuit shown in FIG. 1, this conventional switching power supply circuit also includes an input terminal 1, an output terminal 2, capacitors 6, 16, 17, resistors 7, 8, 18, an error amplifier 9, a power supply 10, a PWM comparator 11, and a triangular wave oscillator 12.

The inductor 5b is connected between the input terminal 1 and a node N1b. A gate electrode of the NMOS transistor 3b is connected to an output terminal of the gate driver 13b, a source electrode thereof is connected to a ground potential, and a drain electrode thereof is connected to the node N1b. An input terminal of the gate driver 13b is connected to an output terminal of the PWM comparator 11. An anode electrode of the diode 4b is connected to the node N1b, and a cathode electrode thereof is connected to the output terminal 2.

The switching power supply circuit according to the second modification of the present invention shown in FIG. 8 includes a phase compensation circuit 19 including a resistor 20 and a capacitor 21, in addition to the conventional switching power supply circuit shown in FIG. 7. The resistor 20 is connected between the gate electrode of the NMOS transistor 3b and the capacitor 21, and the capacitor 21 is connected between the resistor 20 and a node N2.

Third Modification

Figure 9:
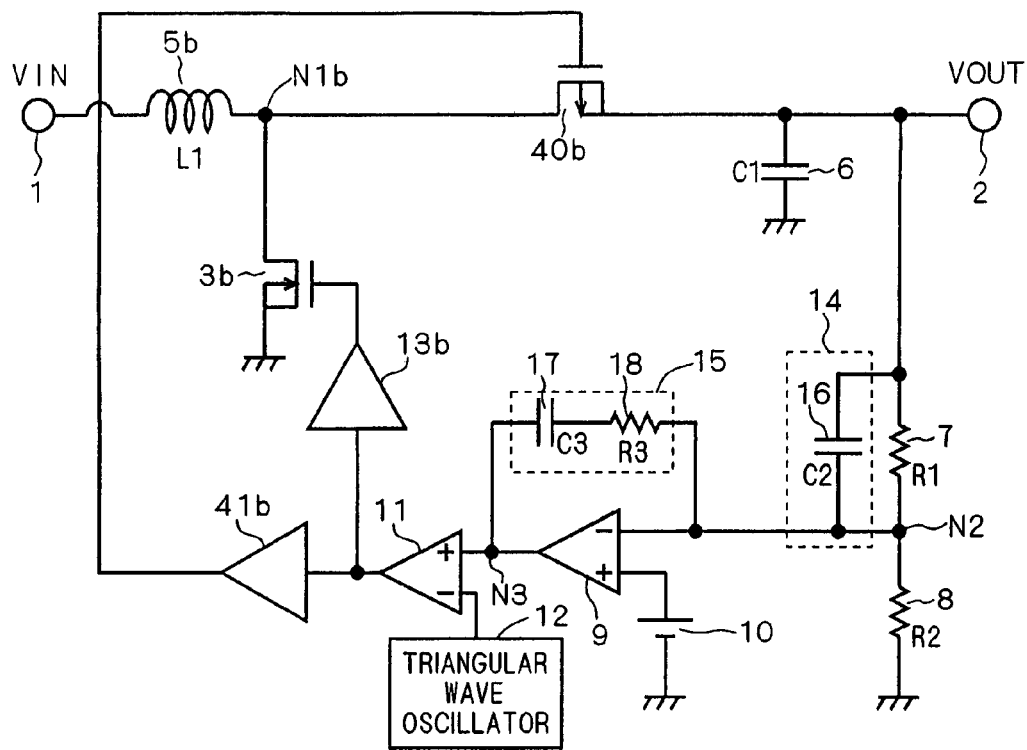
FIG. 9 is a circuit diagram showing a configuration of a conventional switching power supply circuit.
Figure 10:
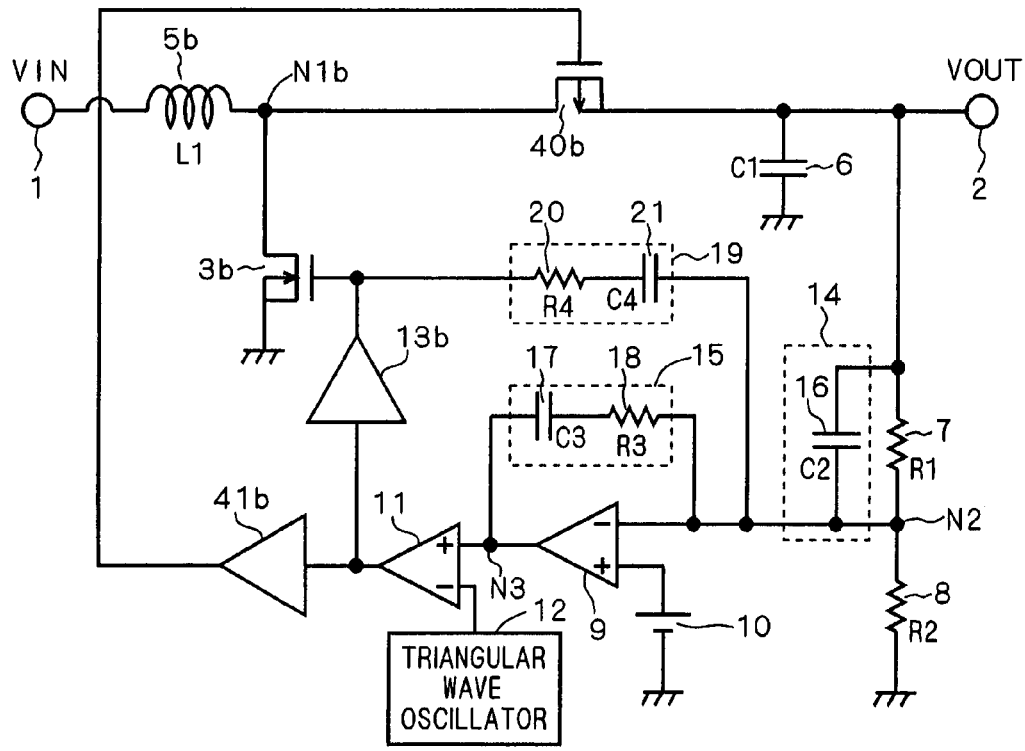
FIG. 10 is a circuit diagram showing a configuration of a switching power supply circuit according to a third modification of the present invention, which corresponds to FIG. 9.

FIG. 9 is a circuit diagram showing a configuration of a conventional switching power supply circuit. FIG. 10 is a circuit diagram showing a configuration of a switching power supply circuit according to a third modification of the present invention, corresponding to FIG. 9. FIGS. 9 and 10 each show a step-up synchronous rectification switching power supply circuit.

In the conventional switching power supply circuit shown in FIG. 9, a PMOS transistor 40b and a gate driver 41b are provided in place of the diode 4b in the conventional switching power supply circuit shown in FIG. 7. A gate electrode of the PMOS transistor 40b is connected to an output terminal of the gate driver 41b, a source electrode thereof is connected to a node N1b, and a drain electrode thereof is connected to the output terminal 2. An input terminal of the gate driver 41b is connected to an output terminal of the PWM comparator 11.

The switching power supply circuit according to the third modification of the present invention shown in FIG. 10 includes a phase compensation circuit 19 including a resistor 20 and a capacitor 21, in addition to the conventional switching power supply circuit shown in FIG. 9. As in the switching power supply circuit according to the second modification of the present invention shown in FIG. 8, the resistor 20 is connected between the gate electrode of the NMOS transistor 3b and the capacitor 21, and the capacitor 21 is connected between the resistor 20 and a node N2.

Fourth Modification

Figure 11:
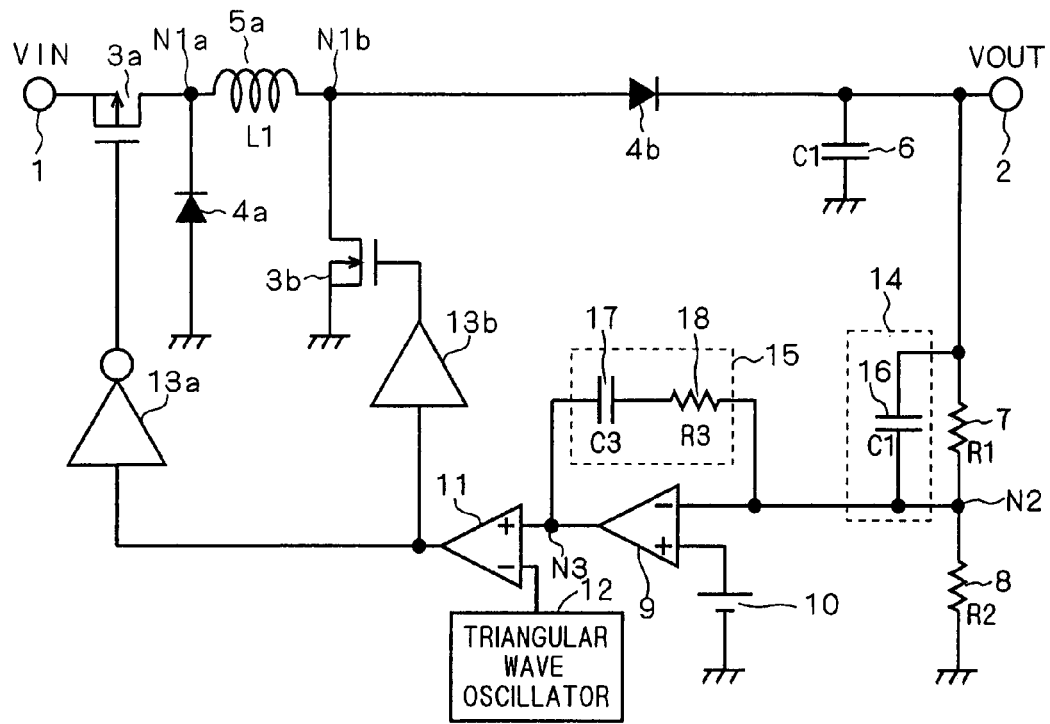
FIG. 11 is a circuit diagram showing a configuration of a conventional switching power supply circuit.
Figure 12:
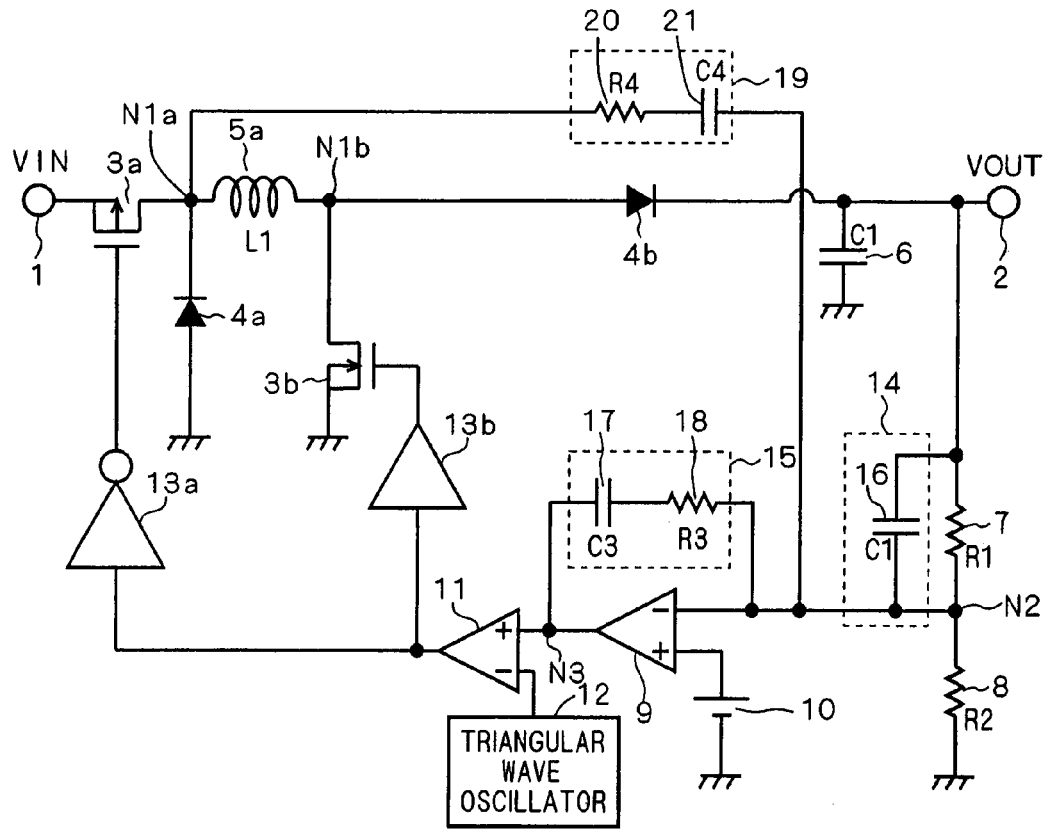
FIG. 12 is a circuit diagram showing a configuration of a switching power supply circuit according to a fourth modification of the present invention, which corresponds to FIG. 11.

FIG. 11 is a circuit diagram showing a configuration of a conventional switching power supply circuit. FIG. 12 is a circuit diagram showing a configuration of a switching power supply circuit according to a fourth modification of the present invention, corresponding to FIG. 11. FIGS. 11 and 12 each show a step-up/down diode rectification switching power supply circuit.

Referring to FIG. 11, similar to the conventional switching power supply circuit shown in FIG. 1, the conventional step-up/down diode rectification switching power supply circuit includes an input terminal 1, an output terminal 2, a PMOS transistor 3a, a diode 4a, an inductor 5a, capacitors 6, 16, 17, resistors 7, 8, 18, an error amplifier 9, a power supply 10, a PWM comparator 11, a triangular wave oscillator 12, and the gate driver 13a. Similar to the conventional switching power supply circuit shown in FIG. 7, this conventional switching power supply circuit in the fourth modification also includes an NMOS transistor 3b, a diode 4b, and a gate driver 13b.

The switching power supply circuit according to the fourth modification of the present invention shown in FIG. 12 includes a phase compensation circuit 19 including a resistor 20 and a capacitor 21, in addition to the conventional switching power supply circuit shown in FIG. 11. As in the switching power supply circuit according to the embodiment of the present invention shown in FIG. 2, the resistor 20 is connected between a node N1a and the capacitor 21, and the capacitor 21 is connected between the resistor 20 and a node N2.

Fifth Modification

Figure 13:
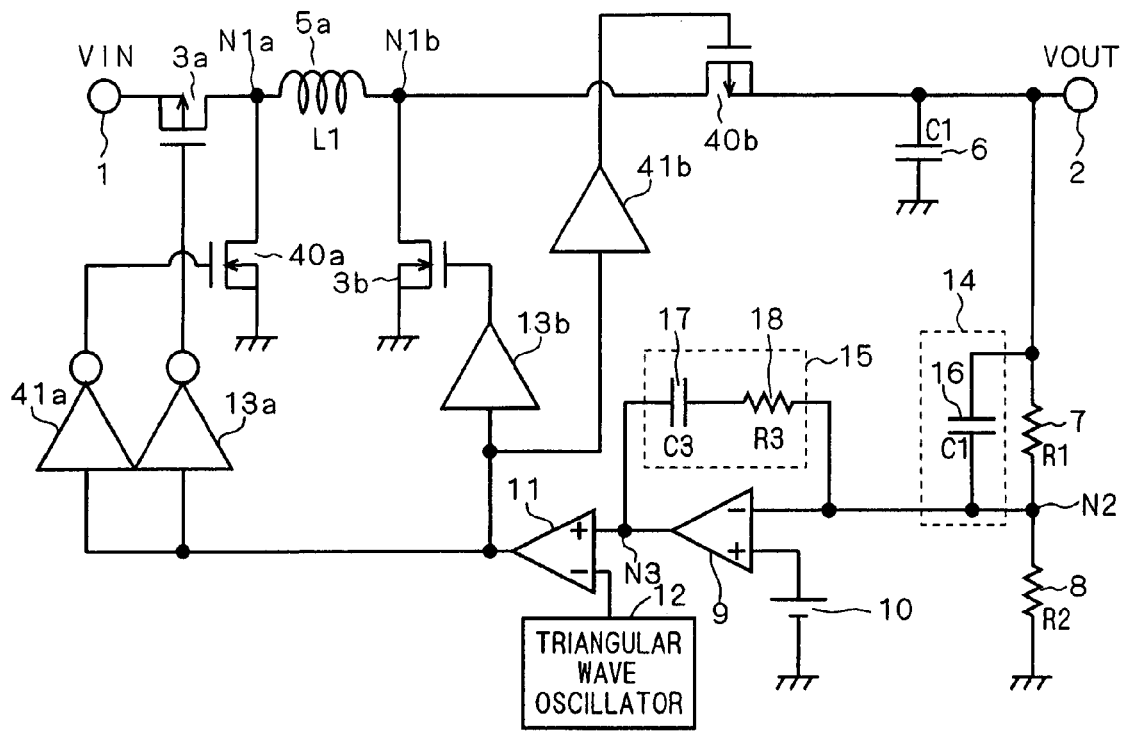
FIG. 13 is a circuit diagram showing a configuration of a conventional switching power supply circuit.
Figure 14:
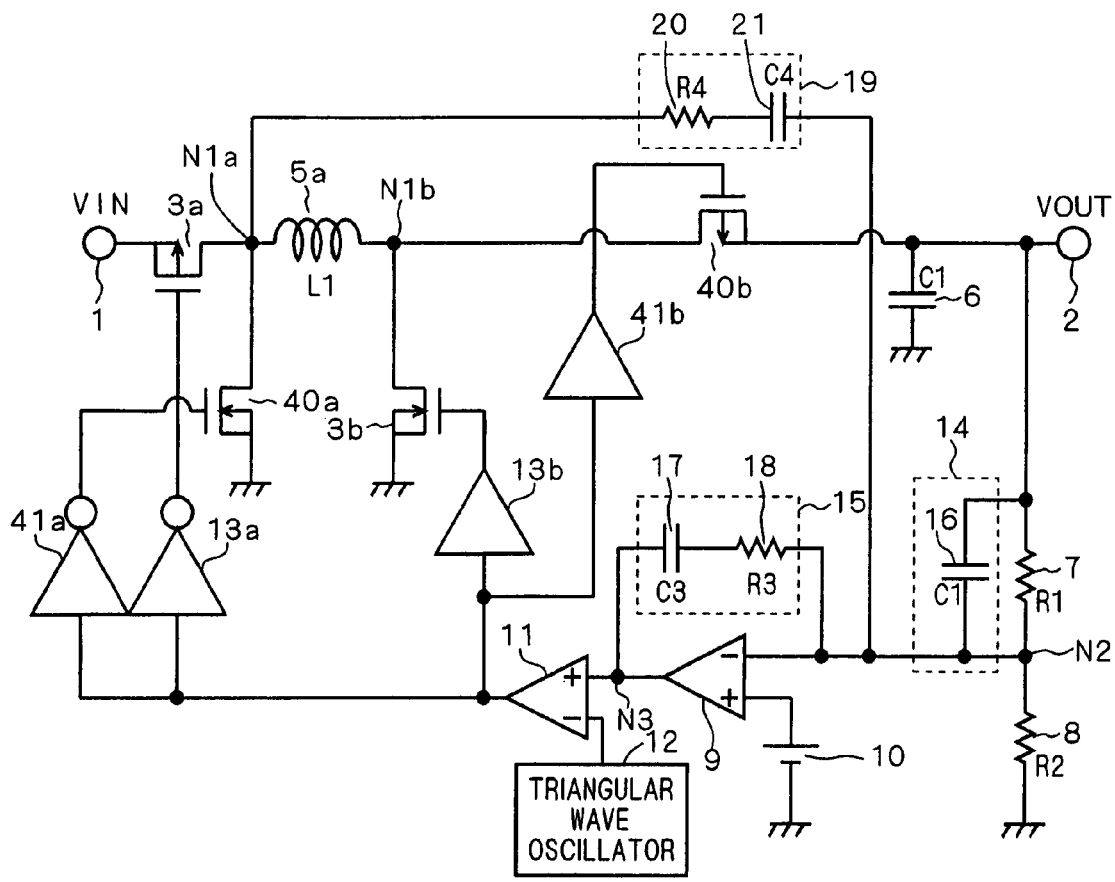
FIG. 14 is a circuit diagram showing a configuration of a switching power supply circuit according to a fifth modification of the present invention, which corresponds to FIG. 13.

FIG. 13 is a circuit diagram showing a configuration of a conventional switching power supply circuit. FIG. 14 is a circuit diagram showing a configuration of a switching power supply circuit according to a fifth modification of the present invention, corresponding to FIG. 13. FIGS. 13 and 14 each show a step-up/down synchronous rectification switching power supply circuit.

In the conventional switching power supply circuit shown in FIG. 13, an NMOS transistor 40a and a gate driver 41a are provided in place of the diode 4a in the conventional switching power supply circuit shown in FIG. 11. Further, a PMOS transistor 40b and a gate driver 41b are provided in place of the diode 4b in the conventional switching power supply circuit shown in FIG. 11.

As in the conventional switching power supply circuit shown in FIG. 5, a gate electrode of the NMOS transistor 40a is connected to an output terminal of the gate driver 41a, a source electrode thereof is connected to a ground potential, and a drain electrode thereof is connected to a node N1a. An input terminal of the gate driver 41a is connected to an output terminal of the PWM comparator 11. Further, as in the conventional switching power supply circuit shown in FIG. 9, a gate electrode of the PMOS transistor 40b is connected to an output terminal of the gate driver 41b, a source electrode thereof is connected to a node N1b, and a drain electrode thereof is connected to the output terminal 2. An input terminal of the gate driver 41b is connected to the output terminal of the PWM comparator 11.

The switching power supply circuit according to the fifth modification of the present invention shown in FIG. 14 includes a phase compensation circuit 19 including a resistor 20 and a capacitor 21, in addition to the conventional switching power supply circuit shown in FIG. 13. As in the switching power supply circuit according to the fourth modification of the present invention shown in FIG. 12, the resistor 20 is connected between the node N1a and the capacitor 21, and the capacitor 21 is connected between the resistor 20 and a node N2.

Sixth Modification

Figure 15:
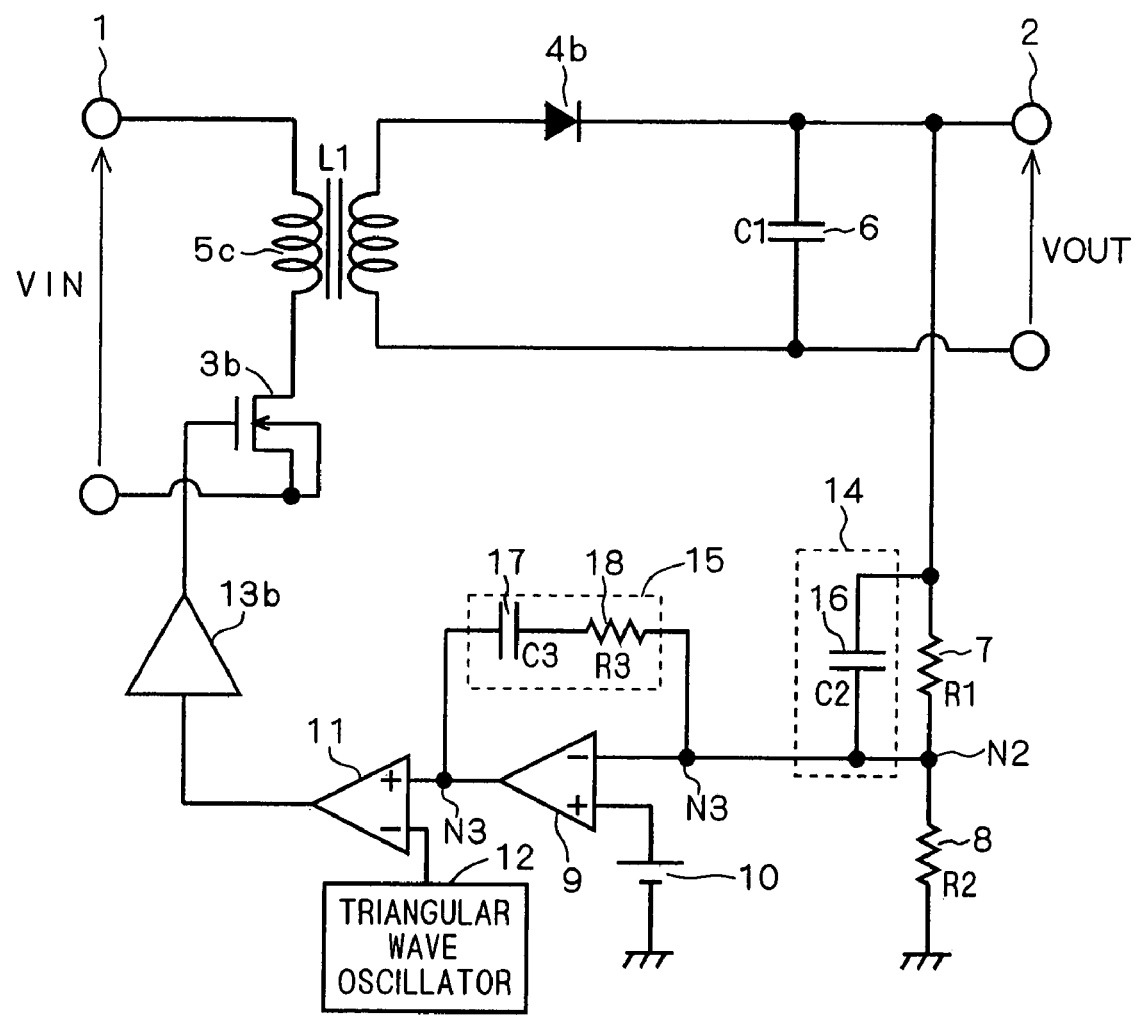
FIG. 15 is a circuit diagram showing a configuration of a conventional switching power supply circuit.
Figure 16:
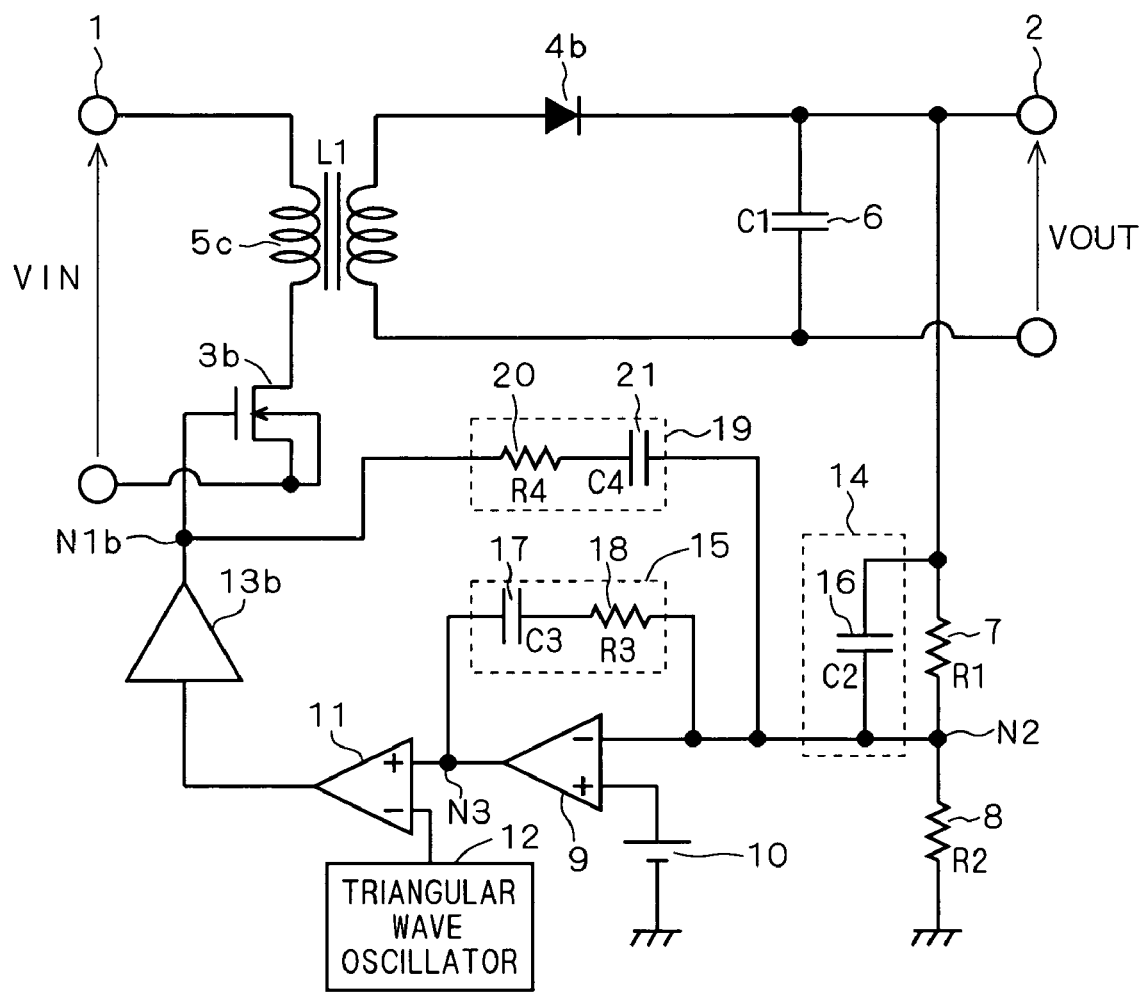
FIG. 16 is a circuit diagram showing a configuration of a switching power supply circuit according to a sixth modification of the present invention, which corresponds to FIG. 15.

FIG. 15 is a circuit diagram showing a configuration of a conventional switching power supply circuit. FIG. 16 is a circuit diagram showing a configuration of a switching power supply circuit according to a sixth modification of the present invention, corresponding to FIG. 15. FIGS. 15 and 16 each show a flyback-type switching power supply circuit.

Referring to FIG. 15, the conventional flyback-type switching power supply circuit includes a transformer 5c and, similar to the conventional switching power supply circuit shown in FIG. 7, an input terminal 1, an output terminal 2, an NMOS transistor 3b, a diode 4b, a gate driver 13b, capacitors 6, 16, 17, resistors 7, 8, 18, an error amplifier 9, a power supply 10, a PWM comparator 11, and a triangular wave oscillator 12. Namely, in the example of the conventional switching power supply circuit shown in FIG. 15, a transformer 5c is provided in place of the inductor 5b shown in FIG. 7.

The switching power supply circuit according to the sixth modification of the present invention shown in FIG. 16 includes a phase compensation circuit 19 including a resistor 20 and a capacitor 21, in addition to the conventional switching power supply circuit shown in FIG. 15. The resistor 20 is connected between a node N1b located between the gate electrode of the NMOS transistor 3b and the gate driver 13b and the capacitor 21. The capacitor 21 is connected between the resistor 20 and a node N2.

Seventh Modification

Figure 17:
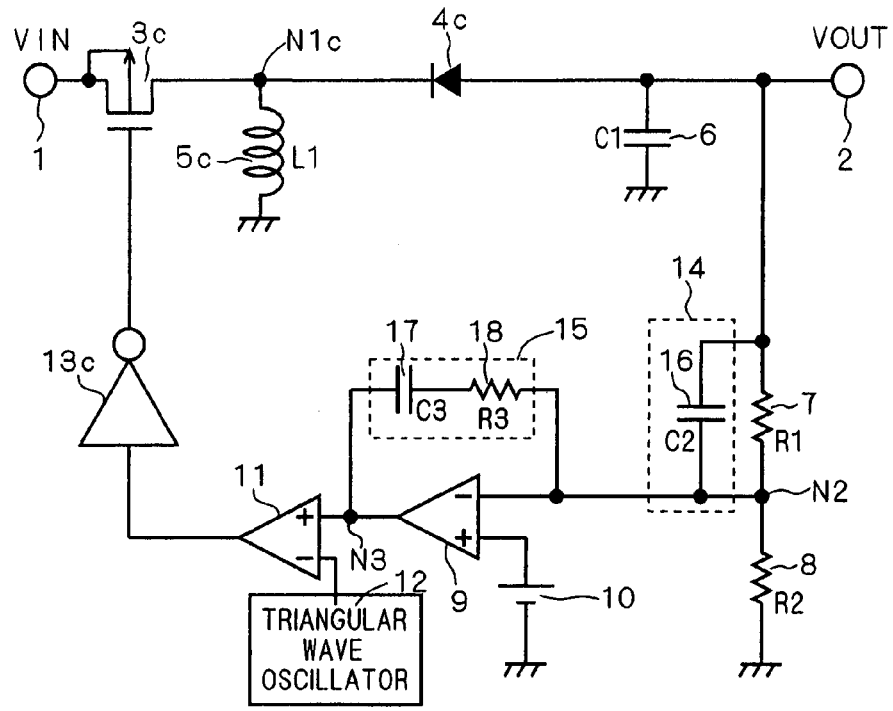
FIG. 17 is a circuit diagram showing a configuration of a conventional switching power supply circuit.
Figure 18:
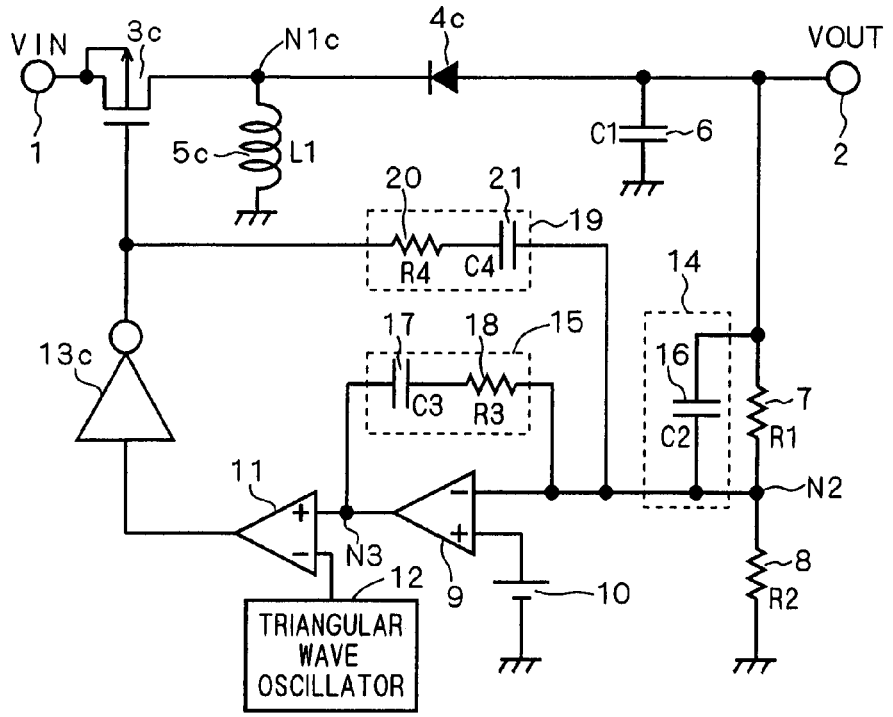
FIG. 18 is a circuit diagram showing a configuration of a switching power supply circuit according to a seventh modification of the present invention, which corresponds to FIG. 17.

FIG. 17 is a circuit diagram showing a configuration of a conventional switching power supply circuit. FIG. 18 is a circuit diagram showing a configuration of a switching power supply circuit according to a seventh modification of the present invention, corresponding to FIG. 17. FIGS. 17 and 18 each show an inversion-type switching power supply circuit.

Referring to FIG. 17, the conventional inversion-type switching power supply circuit includes a PMOS transistor 3c, an inductor 5c, a diode 4c, and a gate driver 13c. Similar to the conventional switching power supply circuit shown in FIG. 1, this switching power supply circuit also includes an input terminal 1, an output terminal 2, capacitors 6, 16, 17, resistors 7, 8, 18, an error amplifier 9, a power supply 10, a PWM comparator 11, and a triangular wave oscillator 12.

A gate electrode of the PMOS transistor 3c is connected to an output terminal of the gate driver 13c, a drain electrode thereof is connected to the input terminal 1, and a source electrode thereof is connected to a node N1c. An input terminal of the gate driver 13c is connected to an output terminal of the PWM comparator 11. An anode electrode of the diode 4c is connected to the output terminal 2, and a cathode electrode thereof is connected to the node N1c. The inductor 5c is connected between the node N1c and a ground potential.

The switching power supply circuit according to the seventh modification of the present invention shown in FIG. 18 includes a phase compensation circuit 19 including a resistor 20 and a capacitor 21, in addition to the conventional switching power supply circuit shown in FIG. 17. The resistor 20 is connected between the gate electrode of the PMOS transistor 3c and the capacitor 21. The capacitor 21 is connected between the resistor 20 and a node N2.

Eighth Modification

Figure 19:
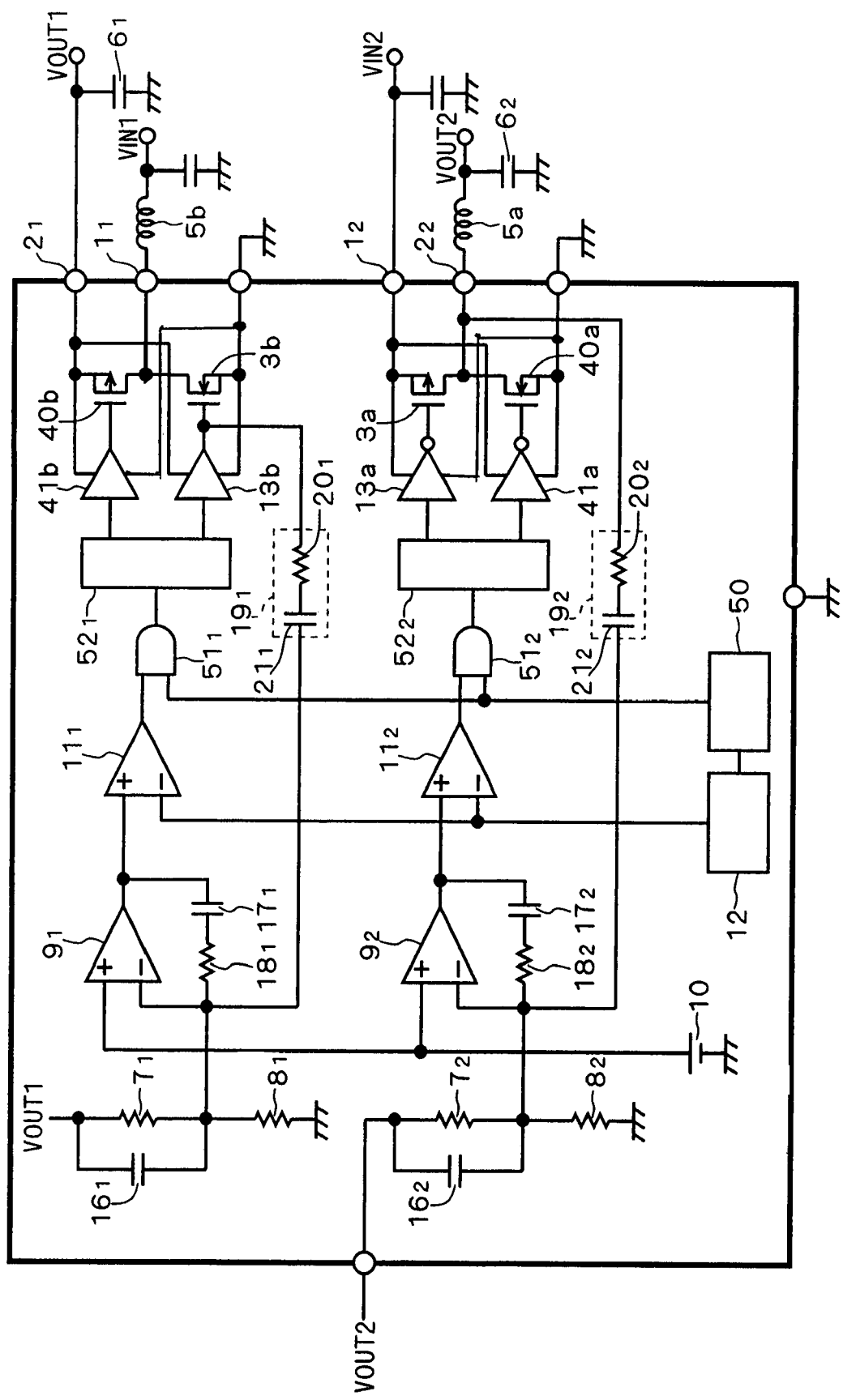
FIG. 19 is a circuit diagram showing a configuration of a switching power supply circuit according to an eighth modification of the present invention.

FIG. 19 is a circuit diagram showing a configuration of a switching power supply circuit according to an eighth modification of the present invention. The switching power supply circuit according to the eighth modification of the present invention is constituted such that the step-down synchronous rectification switching power supply circuit shown in FIG. 6 and the step-up synchronous rectification switching power supply circuit shown in FIG. 10 are mounted within the same one IC chip.

The step-down synchronous rectification switching power supply circuit includes an input terminal $1_2$, an output terminal $2_2$, a PMOS transistor 3a, an NMOS transistor 40a, an inductor 5a, capacitors $6_2$, $16_2$, $17_2$, $21_2$, resistors $7_2$, $8_2$, $18_2$, $20_2$, an error amplifier $9_2$, a power supply 10, a PWM comparator $11_2$, a triangular wave oscillator 12, gate drivers 13a, 41a, a DTC (Dead Time Controller) 50, an AND circuit $51_2$, and a control circuit $52_2$. The resistor $20_2$ and the capacitor $21_2$ constitute a phase compensation circuit $19_2$.

The step-up synchronous rectification switching power supply circuit includes an input terminal $1_1$, an output terminal $2_1$, an NMOS transistor 3b, a PMOS transistor 40b, an inductor 5b, capacitors $6_1$, $16_1$, $17_1$, $21_1$, resistors $7_1$, $8_1$, $18_1$, $20_1$, an error amplifier $9_1$, a power supply 10, a PWM comparator $11_1$, a triangular wave oscillator 12, gate drivers 13b, 41b, a DTC 50, an AND circuit $51_1$, and a control circuit $52_1$. The resistor $20_1$ and the capacitor $21_1$ constitute a phase compensation circuit $19_1$.

It is to be noted that the gate drivers 13a, 13b, 41a, 41b may be switching elements such as MOS transistors or bipolar transistors.

Since connection relationships among each element in the circuit shown in FIG. 19 are basically similar to those among each element in the circuits shown in FIGS. 6 and 10, specific descriptions thereof are omitted here. It is to be noted that the DTC 50 and the AND circuits $51_1$, $51_2$ perform a control for periodically turning off the PMOS transistors 3a, 40b and the NMOS transistors 3b, 40a. Further, the control circuit $52_1$ performs a control for making the timing for switching on/off of the NMOS transistor 3b disagree with the timing for switching off/on of the PMOS transistor 40b. Similarly, the control circuit $52_2$ performs a control for making the timing for switching on/off of the PMOS transistor 3*a* disagree with the timing for switching off/on of the NMOS transistor 40*a*.

It is to be noted that, although the combination of the circuit shown in FIG. 6 and the circuit shown in FIG. 10 is described above, the combination is not limited thereto. It is possible to arbitrarily combine the circuits respectively shown in FIGS. 2, 6, 8, 10, 12, 14, 16 and 18.

Ninth Modification

Figure 20:
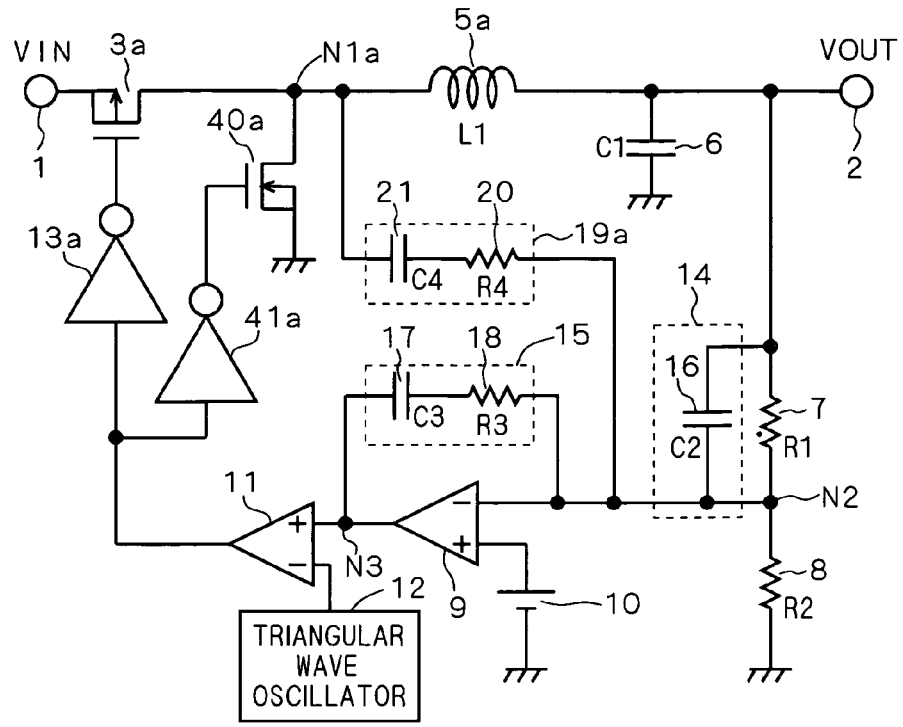
FIG. 20 is a circuit diagram showing a first configuration of a switching power supply circuit according to a ninth modification of the present invention.

FIG. 20 is a circuit diagram showing a first configuration of a switching power supply circuit according to a ninth modification of the present invention, corresponding to FIG. 2. In the circuit shown in FIG. 20, the connection order of a resistor 20 and a capacitor 21 is opposite to that in the circuit shown in FIG. 2. Namely, in a phase compensation circuit 19*a* shown in FIG. 20, the capacitor 21 is connected to a node N2 through the resistor 20. On the other hand, in the phase compensation circuit 19 shown in FIG. 2, the resistor 20 is connected to the node N2 through the capacitor 21.

Figure 21:
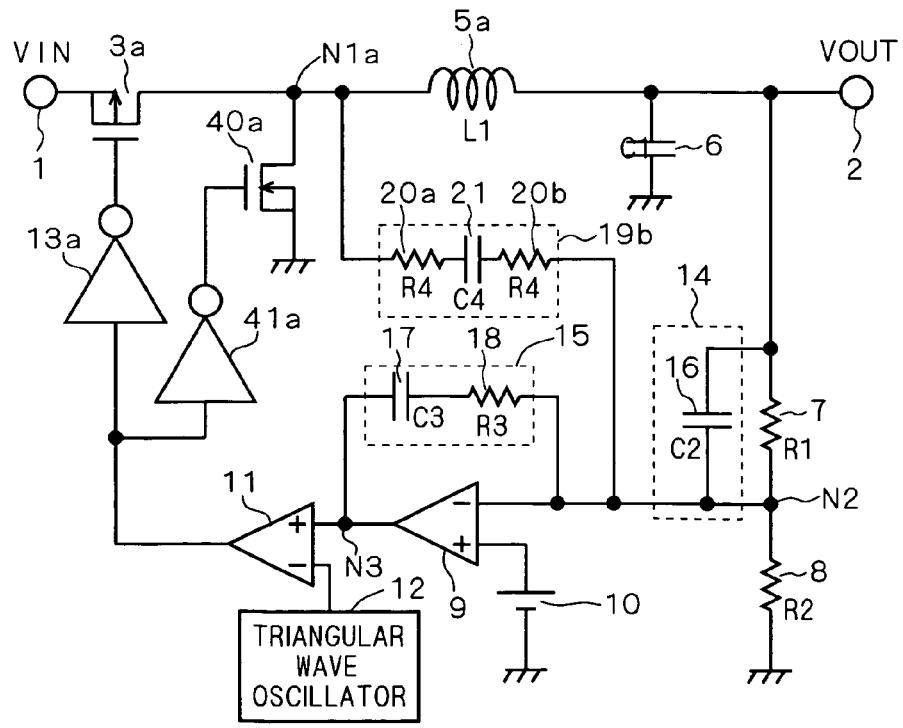
FIG. 21 is a circuit diagram showing a second configuration of the switching power supply circuit according to the ninth modification of the present invention.

FIG. 21 is a circuit diagram showing a second configuration of a switching power supply circuit according to the ninth modification of the present invention, corresponding to FIG. 2. In the circuit shown in FIG. 21, resistors 20*a*, 20*b* are respectively connected to each side of a capacitor 21. Namely, in a phase compensation circuit 19*b* shown in FIG. 21, a resistor 20*a* is connected to a node N2 through the capacitor 21 and the resistor 20*b*.

As thus described, the phase compensation circuit 19*a* shown in FIG. 20 or the phase compensation circuit 19*b* shown in FIG. 21 may be used in place of the phase compensation circuit 19 shown in FIG. 2. This applies to the phase compensation circuits 19 respectively shown in FIGS. 6, 8, 10, 12, 14, 16 and 18, and the phase compensation circuits $19_1$, $19_2$ shown in FIG. 19.

However, in cases including a case where a gate capacitor of a transistor constitutes a capacitor C4, a desirable configuration from the view point of enhancing surge withstand capability to protect the circuit is made by arrangement of a resistor R4 and the capacitor 21 in this order seen from the input terminal 1. Namely, the phase compensation circuits 19 shown in FIG. 2 and the like and the phase compensation circuit 19*b* shown in FIG. 21 are preferred to the phase compensation circuit 19*a* shown in FIG. 20.

First Embodiment

In the following, the step-down synchronous rectification switching power supply circuit shown in FIG. 6 is taken as an example, and respective specific numeral values of the resistance values R3, R4 of the resistors 18, 20, capacitances C1, C3, C4 of the capacitances 6, 17, 21, and the inductance L1 of the inductor 5*a* will be described.

Respective desirable ranges of the resistance value R4, the capacitances C1, C4 and the inductance L1 change according to a oscillation frequency of the triangular wave oscillator 12. The oscillation frequency of the triangular wave oscillator 12 is in the range of 500 Hz to several MHz. In this case, the desirable range of the resistance value R4 is from 10 to 1000 kΩ, the desirable range of the capacitance C1 is from 1 to 100 µF, the desirable range of the capacitance C4 is from 1 to 1000 pF, and the desirable range of the inductance L1 is from 0.1 to 100 µH.

Specifically, when the oscillation frequency of the triangular wave oscillator 12 is 1 MHz, the desirable range of the resistance value R4 is from 10 to several hundreds kΩ, and the desirable range of the capacitance C1 is from 1 to several tens µF, the desirable range of the capacitance C4 is from 1 to several hundreds pF, and the desirable range of the inductance L1 is from 0.1 to several µH.

Further, the desirable range of the resistance value R3 is from several to several tens kΩ, and the desirable range of the capacitance C3 is from several to several tens pF. Therefore, a difference between the order ($10^3$ to $10^4$) of the resistance value R3 and the order ($10^4$ to $10^5$) of the resistance value R4 is within two digits, and a difference between the order ($10^{-12}$ to $10^{-11}$) of the capacitance C3 and the order ($10^{-12}$ to $10^{-10}$) of the capacitance C4 is within two digits.

When the resistance value R3 and the capacitance C3 become extremely small as compared with the resistance value R4 and the capacitance C4, the effect due to the phase compensation circuit 15 cannot be obtained. Such a problem can be avoided by setting the resistance values R3, R4 and the capacitances C3, C4 such that the above-mentioned order differences are within two digits.

It is to be noted that, although specific numerical values of the resistance values R3, R4, the capacitances C1, C3, C4, and the inductances L1 are described above taking the circuit shown in FIG. 6 as an example, similar numerical values can be applied to the respective circuits shown in FIGS. 2, 8, 10, 12, 14, 16, 18 and 19.

Second Embodiment

Figure 22:
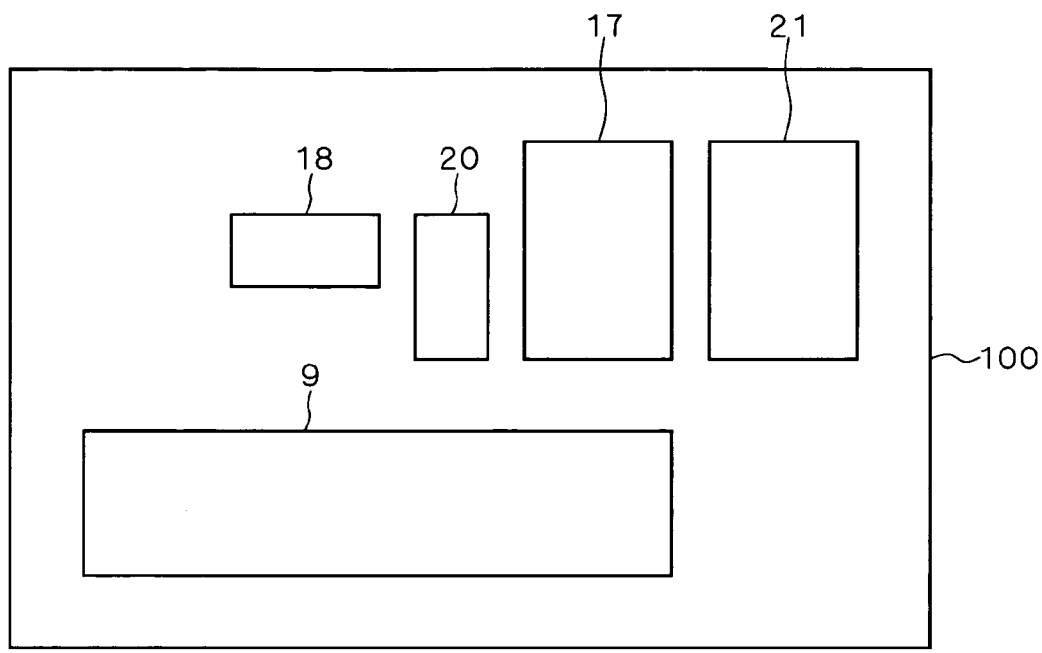
FIG. 22 is a top view schematically showing part of a layout pattern of an IC chip on which the switching power supply circuit according to the present invention is mounted.

FIG. 22 is a top view schematically showing part of a layout pattern of an IC chip on which the switching power supply circuit according to the present invention is mounted. In a predetermined region of a silicon substrate 100, an error amplifier 9, resistors 18, 20, and capacitors 17, 21 are formed.

Figure 23:
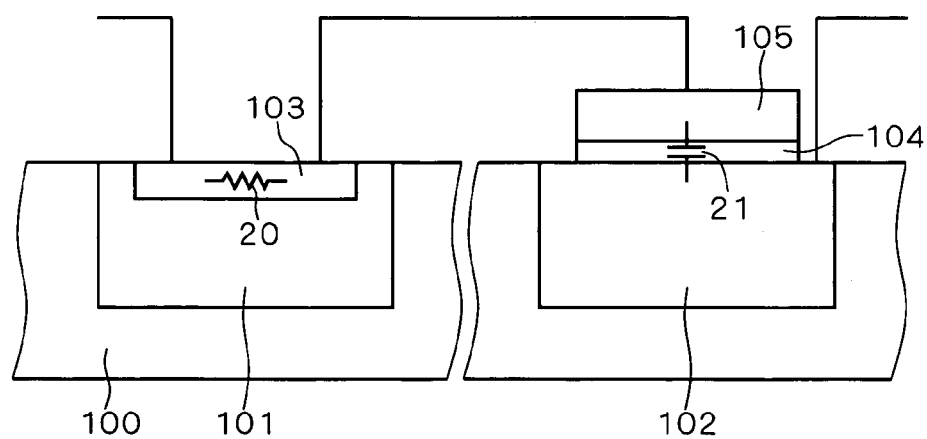
FIG. 23 is a sectional view showing a cross-sectional structure of a portion of the IC chip shown in FIG. 22, where a resistor and a capacitor are formed.

Further, FIG. 23 is a sectional view showing a cross-sectional structure of a portion of an IC chip shown in FIG. 22, where the resistor 20 and the capacitor 21 are formed. N-type wells 101, 102 are partially formed within the top face of a P-type silicon substrate 100. A P$^+$-type impurity diffusion layer 103 which functions as the resistor 20 is partially formed within the top face of the well 101. A gate insulating film 104, made of silicon oxide or the like, is partially formed on the top face of the well 102. A gate electrode 105, made of polysilicon or the like, is formed on the gate insulating film 104. The gate electrode 105, the gate insulating film 104, and the well 102 function as the capacitor 21.

While the invention has been shown and described in detail, the foregoing description is in all aspects illustrative and not restrictive. It is therefore understood that numerous modifications and variations can be devised without departing from the scope of the invention.

What is claimed is:

1. A semiconductor device comprising:
an input terminal;
an output terminal;
a switching element which is connected between a first node located between said input terminal and said output terminal and a ground potential;
an output voltage detection circuit which detects an output voltage as a voltage of said output terminal;
a control circuit which is connected between a control electrode of said switching element and said output voltage detection circuit, and controls driving of said switching element on the basis of said output voltage detected by said output voltage detection circuit; and
a feedback circuit which is connected between said control electrode of said switching element and a second node located between said output voltage detection circuit and said control circuit, and includes a resistive element and a capacitive element, wherein said control circuit includes an error amplifier whose input node is connected to said second node, wherein said resistive element is connected between said control electrode of said switching element and said capacitive element, and said capacitive element is connected between said resistive element and said input node of said error amplifier, and wherein said control circuit includes a phase compensation circuit being connected between said input node of the error amplifier and an output node of the error amplifier.

2. The semiconductor device according to claim 1, wherein said resistive element is connected to said second node through said capacitive element.

3. The semiconductor device according to claim 1, wherein said phase compensation circuit includes a resistive element and a capacitive element, a difference between the order of a resistance value of said resistive element in said feedback circuit and the order of a resistance value of said resistive element in said phase compensation circuit is within two digits, and a difference between the order of a capacitance of said capacitive element in said feedback circuit and the order of a capacitance of said capacitive element in said phase compensation circuit is within two digits.

4. A semiconductor device comprising:

a first input terminal;

a first output terminal;

a first switching element which is connected between said first input terminal and said first output terminal;

a first output voltage detection circuit which detects a first output voltage as a voltage of said first output terminal;

a first control circuit which is connected between a control electrode of said first switching element and said first output voltage detection circuit, and controls driving of said first switching element on the basis of said first output voltage detected by said first output voltage detection circuit;

a first feedback circuit which is connected between a first node as an output electrode of said first switching element and a second node located between said first output voltage detection circuit and said first control circuit, and includes a first resistive element and a first capacitive element;

a second input terminal;

a second output terminal;

a second switching element which is connected between a third node located between said second input terminal and said second output terminal and a ground potential;

a second output voltage detection circuit which detects a second output voltage as a voltage of said second output terminal;

a second control circuit which is connected between a control electrode of said second switching element and said second output voltage detection circuit, and controls driving of said second switching element on the basis of said second output voltage detected by said second output voltage detection circuit; and a second feedback circuit which is connected between said control electrode of said second switching element and a fourth node located between said second output voltage detection circuit and said second control circuit, and includes a second resistive element and a second capacitive element, wherein said first control circuit includes a first error amplifier whose input node is connected to said second node, wherein said first resistive element is connected between said first node and said first capacitive element, and said first capacitive element is connected between said first resistive element and said input node of said first error amplifier, and wherein said first control circuit includes a first phase compensation circuit being connected between said input node of the first error amplifier and an output node of the first error amplifier, wherein said second control circuit includes a second error amplifier whose input node is connected to said fourth node, wherein said second resistive element is connected between said control electrode of said second switching element and said second capacitive element, and said second capacitive element is connected between said second resistive element and said input node of said second error amplifier, and wherein said second control circuit includes a second phase compensation circuit being connected between said input node of the second error amplifier and an output node of the second error amplifier.

5. The semiconductor device according to claim 4, further comprising:

a third switching element which is connected between said first node and a ground potential; and a fourth switching element which is connected between said third node and said second output terminal, wherein said first control circuit has:

a first driver which is connected to said control electrode of said first switching element; and a second driver which is connected to a control electrode of said third switching element, and said second control circuit has:

a third driver which is connected to said control electrode of said second switching element; and a fourth driver which is connected to a control electrode of said fourth switching element.

6. The semiconductor device according to claim 4, wherein said first resistive element is connected to said second node through said first capacitive element, and said second resistive element is connected to said fourth node through said second capacitive element.

7. The semiconductor device according to claim 4, wherein said first phase compensation circuit includes a third resistive element and a third capacitive element, said a second phase compensation circuit includes a fourth resistive element and a fourth capacitive element, a difference between the order of a resistance value of said first resistive element and the order of a resistance value of said third resistive element is within two digits, a difference between the order of a capacitance of said first capacitive element and the order of a capacitance of said third capacitive element is within two digits, a difference between the order of a resistance value of said second resistive element and the order of a resistance value of said fourth resistive element is within two digits, and a difference between the order of a capacitance of said second capacitive element and the order of a capacitance of said fourth capacitive element is within two digits.

* * * * *